Feb. 16, 1937. J. R. GAMMETER 2,071,300
METHOD OF PRESERVING PERISHABLE FOOD PRODUCTS
Filed March 10, 1936

INVENTOR
JOHN R. GAMMETER
BY
ATTORNEY

Patented Feb. 16, 1937

2,071,300

UNITED STATES PATENT OFFICE 2,071,300

METHOD OF PRESERVING PERISHABLE FOOD PRODUCTS

John R. Gammeter, Akron, Ohio, assignor of one-half to Susan G. Gammeter, Akron, Ohio Application March 10, 1936, Serial No. 68,036

7 Claims. (Cl. 99—174)

This invention relates to a new method of preserving perishable food products and has for its primary object to provide an enclosure or wrapping therefor of flexible material which is moisture, oil and acid proof, and so treated as to adhere to the product, thus preventing oxidation taking place which usually is the cause of shrinkage resulting in loss of weight or in the product becoming rancid.

It is well known that meats lose considerable of their weight between slaughter and use as a result of oxidation taking place and this despite the fact that the meats are kept in refrigerators. Oxidation causes the outside of the meats to become black and moldy and these portions must be scraped or cut off before the meat can be used. With fowls oxidation results in rancidity which spoils them for eating.

Various schemes have been tried in endeavoring to overcome this condition such as covering with water and freezing, and while good results are thus obtained it is very inconvenient in handling and some products of course cannot be so treated. The articles further have been wrapped in cloth or other material, but this has been solely for the purpose of preventing dust or dirt from accumulating on the articles or to prevent actual hand contact in handling. Frequently meats and the like are kept in storage for years before use which further aggravates the condition.

It is therefore a further object of the invention to provide a container or wrapper for the perishable products applied in a manner to eliminate appreciable air therefrom and then sealed, the material being thin, flexible, moisture, oil and acid proof, unaffected by temperature conditions, and which will contact and adhere to the product upon treatment with heat.

A further object of the invention is to use a thin, flexible sheet composed of a rubber hydrohalide film such as disclosed in the Calvert Patent No. 1,989,632, dated January 29, 1935, and known on the market as "Pliofilm", or a material having suitable similar characteristics.

A still further object of the invention is to package the product in the presence of $CO_2$ before sealing which additionally counteracts any tendency toward oxidation.

A still further object of the invention is to provide a simple and inexpensive method of packaging such products.

With the objects above indicated and other objects hereinafter explained in view, the invention consists in the improved method and packaged products produced thereby as hereinafter described.

Referring to the drawing.

Figure 1:
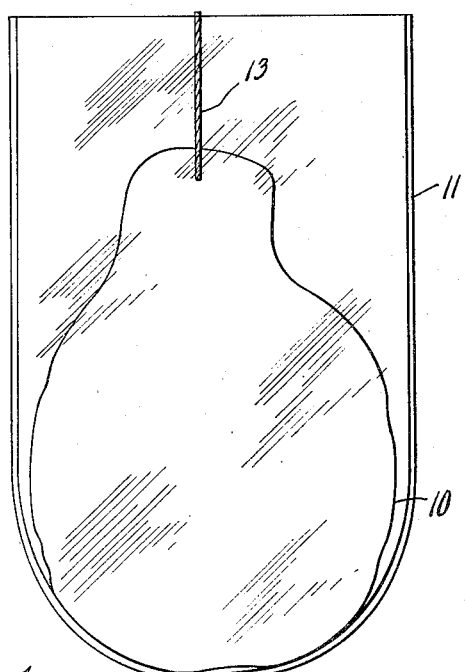
Figure 1 is a vertical section of a perishable product and wrapper or enclosure therefor constituting one of the steps of the method.

In the drawing, I have shown for purpose of exemplification a ham packaged according to my improved method, but it should be understood that practically any perishable product may be packaged in a similar manner.

A ham 10 of the usual shape and preferably at the time it is cut from the hog, brined, smoked, etc., is placed within a container or bag 11 as shown in Figure 1. This container 11 is made from thin sheets of flexible material composed of a rubber hydrohalide film such as disclosed in the Calvert patent heretofore referred to or of a material having suitable similar characteristics. This sheet material is approximately .001" thick, flexible, moisture, oil and acid proof, and will heat seal at about 300° F.

Figure 2:
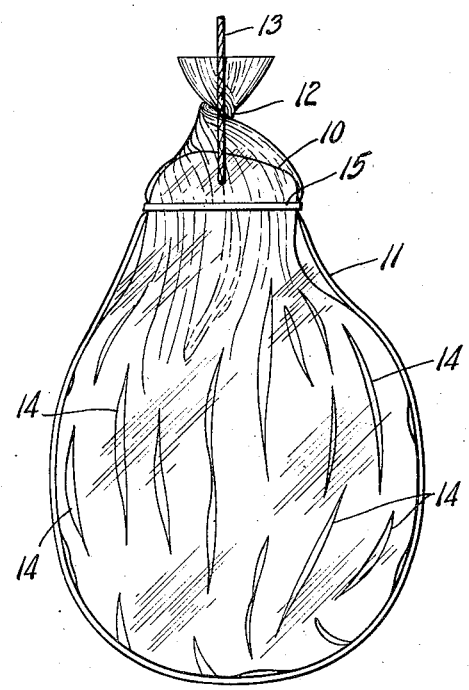
Figure 2 is a front elevational view of the same before sealing.
Figure 3:
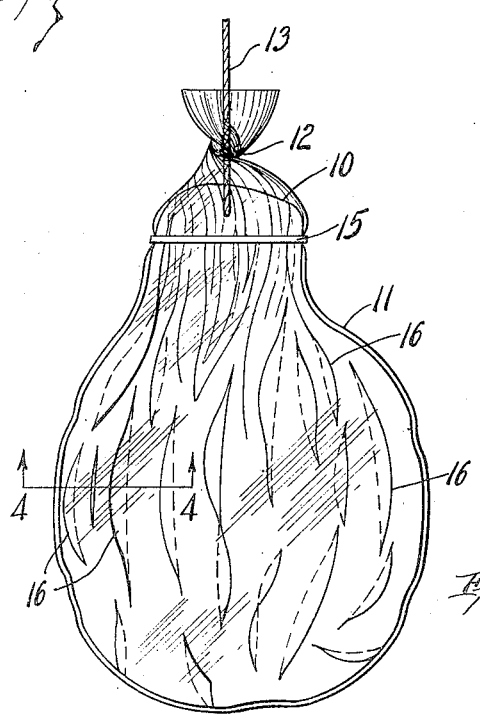
Figure 3 is a front elevational view of the same after sealing.
Figure 4:
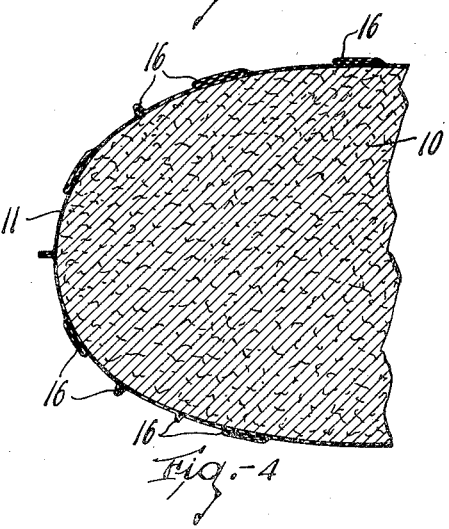
Figure 4 is a fragmentary cross-sectional view taken on line 4—4 of Figure 3.

When the ham 10 is so disposed within the container 11, the open end is closed by twisting as indicated at 12 about the usual cord 13 attached to the end of the ham and by which it may be suspended in the usual manner. The interior of the container 11 is evacuated to remove substantially all of the air therefrom which may be effected by any suitable means. Such evacuation causes the walls of the container 11 to hug closely the outer surface of the ham and produces wrinkled portions 14 extending thereover as more clearly shown in Figure 2. At this point a clamp or securing means 15, in this instance an elastic band, may be applied adjacent the twisted portion 12 and the latter sealed by a suitable iron at a temperature of approximately 300° F. to render the same airtight.

Next, the sealed container and ham are subjected to hot air at a temperature of 300° to 350° F. for a period of approximately ten to fifteen seconds which softens the container material and the evacuated condition of the container causes the latter to conform more or less to the shape of the ham and wrinkled upon itself, eliminating all surrounding air. When the heat is removed the wrinkled portions cohere as shown at 16 and the container contracts, thus entirely enclosing the ham without actually sticking thereto and preventing the entrance of air. The packaged ham is then ready to be placed in cold storage and is unaffected by freezing temperatures. These packaged hams can be placed in contact with one another without any tendency to stick together and the container material will not readily puncture or otherwise become damaged.

Hams or other products so packaged will keep indefinitely without losing any weight and without spoiling. Additionally the material is transparent so that the products can be seen therethrough, and when the products are ready for use the container can be removed and returned as reclaim to be rerun into the original sheets without affecting its original characteristics.

Quarters of beef, lamb, etc., may be covered with the same material. In this case a bag is slipped over the beef and evacuated in a similar manner, sealing the bag preferably on the leg just below the hock or joint. The bag containing the beef is then passed through a chamber for a period of ten to twenty seconds in which the temperature is from 300° to 400° F. The chamber is preferably fitted with two air locks and a trolley upon which the beef is supported. The interior of the chamber in this case may be maintained at one or two pounds pressure so that when the beef passes therethrough the bag material will be pressed about the surface of the beef. Naturally the softened bag material will hug all parts of the carcass and wrinkle upon itself in a manner heretofore explained and the wrinkled portions adhere to each other, excluding all air, thus preventing oxidation, odors, dirt, flies, etc. The bag material does not adhere to the beef and can be readily removed in large pieces in the retail shop, saved and returned for reuse, the scrap having a reclaim value of approximately 25% of the original cost of the material.

Fowls may likewise be packaged and preferably the legs, wings and neck are tied down to make it as round and compact as possible. The tied fowl is then inserted in a bag and the latter evacuated and sealed in the manner already explained. The sealed bag containing the fowl is next subjected to hot air at a temperature of approximately 300° to 350° F. for a period of ten to fifteen seconds. This softens the bag material and the vacuum causes the latter to conform to the shape of the fowl and wrinkle upon itself, thus eliminating all air. In stacking these in boxes they will not freeze together and the bag material prevents oxidation of the skin and fat, thus preventing the fowl from becoming rancid.

Chicken, duck, fish, etc., can be placed in a bag and if the entrails have been removed the bag can be partially filled with water which fills the hollow portions of the fowl. The bag is next evacuated in the manner heretofore explained, thus removing all excess water and is then heat sealed at the neck. The packaged fowl is then frozen and in this case it is not necessary to heat the bag unless desired.

The products may be packaged in still another manner which consists in placing the flexible container around the product as previously stated and then to employ an elastic or resilient bag which is placed about the container. Pressure is applied to the elastic bag to contract the same about the container which presses the latter into close contact with the product. This contraction of the flexible bag also exhausts the air from within the container and the latter may then be heat sealed before the elastic bag is removed. In some instances it is unnecessary to heat the container material, but if desired the bag may be heated before contracted about the container which softens the material of the latter causing it to wrinkle upon itself and the wrinkled portions to cohere so that the container conforms to the shape of the product and adheres thereto but is readily removed by peeling off. Furthermore heated air may be used as hereinbefore explained to soften the container material and then the bag or other suitable means may be used to compress the container about the product with like results.

Pliofilm is a most suitable material for this purpose but other materials may be used so long as it will heat seal, can be softened and will wrinkle up and stick to itself and yield to conform to the shape of the article being covered or packaged.

Butter, lard, fish, fruit, etc., all may be packaged in a similar manner with like results.

Additionally all of the above products may be first subjected to $CO_2$ gas under a one pound pressure and allowed to remain until a sufficient amount is taken up by the product. The product is then inserted in the bag and the process followed as heretofore stated. When heated the bag material under the pressure stated forces about all of the $CO_2$ out before sealing. When this method is used the material of the bag must be able to resist diffusion.

The bag material may be obtained in various colors so that different cuts or grades of products may be identified when so used.

While I have described the preferred embodiment of the invention, it should be understood that I am not to be limited thereto inasmuch as changes and modifications may be resorted to without departing from the spirit of the invention as defined in the appended claims.

What is claimed is:

1. That method of preserving perishable products which comprises placing a product in a flexible bag, evacuating the interior of said bag to remove substantially all of the air therefrom, heat sealing said bag to maintain its evacuated condition, and subjecting said bag to heat to soften the material thereof whereby the evacuated condition of said bag causes the latter to contract and adhere to said product.

2. That method of preserving perishable products which comprises placing a container around a product, evacuating the interior of said container to remove substantially all of the air therefrom, heat sealing said container to maintain its evacuated condition, and subjecting said container to a temperature of from 300° F. to 400° F. to soften the material thereof whereby the evacuated condition of said container causes the latter to contract and adhere to said product.

3. That method of preserving perishable products which comprises placing a container around a product, applying pressure to the outside of said container to remove substantially all of the air therein, heat sealing said container to prevent the return of any air thereinto, and subjecting said container to heat to soften the material thereof whereby the latter will contract on cooling and adhere to said product.

4. That method of preserving perishable products which comprises subjecting a product to $CO_2$ gas, placing a container around said product, evacuating the interior of said container to remove substantially all of the free $CO_2$ gas, heat sealing said container to maintain its evacuated condition, and subjecting said container to heated air to soften the material thereof whereby the evacuated condition of said container causes the latter to contract and adhere to said product.

5. That method of preserving perishable products which comprises placing a container around a product, subjecting said container to heated air under pressure to soften the material thereof and cause the latter to be compressed about said product to remove the surrounding air to atmosphere, and heat sealing said container to prevent the admission of air thereinto.

6. That method of preserving perishable products which comprises placing a flexible container around a product, evacuating the interior of said container to remove substantially all of the air therefrom thereby causing the material of said container to partially conform to the shape of said product, heat sealing said container to maintain its evacuated condition, and subjecting said container to heated air at a temperature of from 300° F. to 400° F. for ten to twenty seconds to soften the material thereof, said material contracting into substantial engagement with said product by reason of the evacuated condition within said container.

7. That method of preserving perishable products which comprises placing a flexible container around a product, evacuating the interior of said container to remove substantially all of the air therefrom thereby causing the material of said container to partially conform to the shape of said product, heat sealing said container to maintain its evacuated condition, subjecting said container to heated air to soften the material thereof, said material contracting into substantial engagement with said product by reason of the evacuated condition within said container, and subsequently refrigerating the packaged product.

JOHN R. GAMMETER.